US011036608B2

(12) United States Patent
Desikachari et al.

(10) Patent No.: US 11,036,608 B2
(45) Date of Patent: Jun. 15, 2021

(54) IDENTIFYING DIFFERENCES IN RESOURCE USAGE ACROSS DIFFERENT VERSIONS OF A SOFTWARE APPLICATION

(71) Applicant: APPNOMIC SYSTEMS PRIVATE LIMITED, Bengaluru (IN)

(72) Inventors: Padmanabhan Desikachari, Bangalore (IN); Pranav Kumar Jha, Bangalore (IN)

(73) Assignee: APPNOMIC SYSTEMS PRIVATE LIMITED, Bengaluru (IN)

( * ) Notice: Subject to any disclaimer, the term of this patent is extended or adjusted under 35 U.S.C. 154(b) by 0 days.

(21) Appl. No.: 16/787,059

(22) Filed: Feb. 11, 2020

(65) Prior Publication Data

US 2021/0096981 A1    Apr. 1, 2021

(30) Foreign Application Priority Data

Sep. 27, 2019   (IN) .............................. 201941039141

(51) Int. Cl.
| | |
|---|---|
| *G06F 11/34* | (2006.01) |
| *G06F 11/30* | (2006.01) |
| *G06N 20/00* | (2019.01) |
| *G06F 9/46* | (2006.01) |

(52) U.S. Cl.
CPC .......... *G06F 11/3409* (2013.01); *G06F 9/466* (2013.01); *G06F 11/302* (2013.01); *G06F 11/3423* (2013.01); *G06F 11/3466* (2013.01); *G06F 11/3495* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 8,903,757 | B2 | 12/2014 | Desikachari | |
| 10,198,340 | B2 | 2/2019 | Vesepogu et al. | |
| 2003/0046396 | A1* | 3/2003 | Richter | G06F 9/505 709/226 |
| 2006/0112375 | A1* | 5/2006 | Schneider | G06F 11/3476 717/131 |
| 2009/0083737 | A1* | 3/2009 | Ben-Yehuda | G06F 11/3409 718/100 |
| 2012/0296852 | A1* | 11/2012 | Gmach | G06Q 10/06 705/400 |

(Continued)

*Primary Examiner* — Qing Chen
(74) *Attorney, Agent, or Firm* — IPHorizons PLLC; Narendra Reddy Thappeta

(57) ABSTRACT

An aspect of the present disclosure facilitates identifying differences in resource usage across different versions of a software application. In one embodiment, a respective first usage of resources is quantified for each of a set of workload signatures during the processing of transaction instances using a first version of a software application in a first sequence of block durations. A respective second usage of resources is quantified for each of the set of workload signatures during the processing of transaction instances using a second version of the software application in a second sequence of block durations. For each workload signature, the respective first usage and the respective second usage are compared to identify differences in the resource usage across different versions of the software application.

20 Claims, 15 Drawing Sheets

(56) References Cited

U.S. PATENT DOCUMENTS

| | | | |
|---|---|---|---|
| 2013/0185729 A1* | 7/2013 | Vasic | G06F 9/5072 |
| | | | 718/104 |
| 2014/0244643 A1* | 8/2014 | Basak | G06F 16/217 |
| | | | 707/737 |
| 2015/0026582 A1* | 1/2015 | Basak | H04L 41/142 |
| | | | 715/734 |
| 2015/0074035 A1 | 3/2015 | Narasappa | |
| 2015/0142414 A1 | 5/2015 | Desikachari | |
| 2015/0310139 A1 | 10/2015 | Desikachari et al. | |
| 2016/0041848 A1* | 2/2016 | Li | G06F 9/5055 |
| | | | 718/104 |
| 2018/0103088 A1* | 4/2018 | Blainey | H04L 67/1008 |
| 2018/0205666 A1* | 7/2018 | Nash | H04L 67/10 |
| 2018/0300065 A1* | 10/2018 | Talwar | G06F 3/067 |
| 2020/0118039 A1* | 4/2020 | Kocberber | G06N 20/00 |
| 2020/0310851 A1* | 10/2020 | Featonby | G06F 9/5077 |

* cited by examiner

| Time | Txn_LOGIN_AvgRespTime | Txn_LOGIN_Total | Txn_LOGOUT_AvgRespTime | Txn_LOGOUT_Total | ... | Txn_Booking_AvgRespTime | Txn_Booking_Total | ... |
|---|---|---|---|---|---|---|---|---|
| 1/12/2016 0:01 | | | 34.3935 | 1.51033 | ... | 11 | 2 | ... |
| 1/12/2016 0:02 | 3.068 | 2 | 24.3418 | 1.739 | ... | 68 | 13 | ... |
| 1/12/2016 0:03 | 1.792 | 1 | 38.405 | 4.926 | ... | 505 | 86 | ... |
| 1/12/2016 0:04 | | | | 3.54267 | ... | 1,977 | 383 | ... |
| 1/12/2016 0:05 | | | | 186.418 | ... | 2,533 | 724 | ... |
| ... | ... | ... | ... | ... | ... | ... | ... | ... |
| 1/12/2016 0:23 | | | 27.6421 | 1.025 | ... | 4,977 | 383 | ... |
| 1/12/2016 0:24 | 33.102 | 1 | 27.0773 | 7.339 | ... | 17,533 | 724 | ... |

*FIG. 6A*

| Signature ID | Txn_LOGIN | Txn_LOGOUT | Txn_Search_Flight | Txn_Select_Flight | Txn_Search_Hotel | Txn_Select_Hotel | Txn_Booking | Txn_Payment |
|---|---|---|---|---|---|---|---|---|
| S1 | 2 | 1 | 2 | - | 9 | 6 | 11 | 2 |
| S2 | 13 | - | 4 | 3 | 16 | 14 | 68 | 3 |
| S3 | 86 | 5 | 29 | 12 | 155 | 51 | 505 | 14 |
| S4 | 383 | 15 | 152 | 32 | 689 | 203 | 4,977 | 136 |
| S5 | 724 | 35 | 1,022 | 247 | 5,206 | 373 | 17,533 | 1,086 |

| Time | CPU_UTIL | DISK_IOREAD | DISK_IOWRITE | EC_CPU_UTIL | ... | CURRENT_OPEN_CURSORS | LOCKS_WAITS | ... |
|---|---|---|---|---|---|---|---|---|
| 1/12/2016 0:01 | 28.8571 | 141.36 | 971.1 | 21.51033 | ... | 59810 | 0 | ... |
| 1/12/2016 0:02 | 13.068 | 212.2 | 24.3418 | 31.739 | ... | 59873 | 2 | ... |
| 1/12/2016 0:03 | 16.792 | 112.5 | 38.405 | 54.926 | ... | 60772 | 0 | ... |
| 1/12/2016 0:04 | 24.55 | 45.55 | 235.35 | 63.54267 | ... | 61374 | 10 | ... |
| 1/12/2016 0:05 | | 564.5 | 153.8 | 86.418 | ... | 61771 | 19 | ... |
| ... | ... | ... | ... | ... | ... | ... | ... | ... |
| 1/12/2016 0:23 | 17.49 | 5025.5 | 92.6421 | 91.025 | ... | 61798 | 16 | ... |
| 1/12/2016 0:24 | 33.102 | 602.54 | 87.0773 | 70.339 | ... | 61811 | 85 | ... |

| Signature_ID | CPU_UTIL_MEAN | CPU_UTIL_SD | DISK_IOREAD_MEAN | DISK_IOREAD_SD | ... | LOAD_AVERAGE_MEAN | LOAD_AVERAGE_SD | ... |
|---|---|---|---|---|---|---|---|---|
| S1 | 26.5872 | 5.5028 | 17,010.6600 | 7,314.3995 | ... | 8.7314 | 1.5267 | ... |
| S2 | 36.9600 | 6.4800 | 19,376.2000 | 9,356.0600 | ... | 10.6700 | 2.0000 | ... |
| S3 | 48.0000 | 9.3600 | 21,995.3500 | 10576.1600 | ... | 11.4000 | 2.4000 | ... |
| S4 | 62.6400 | 13.2600 | 35,748.9000 | 11,331.6000 | ... | 13.4400 | 3.1800 | ... |
| S5 | 88.7400 | 13.0000 | 37,311.6000 | 18,426.3000 | ... | 12.6000 | 4.0800 | ... |

*FIG. 6E*

IDENTIFYING DIFFERENCES IN RESOURCE USAGE ACROSS DIFFERENT VERSIONS OF A SOFTWARE APPLICATION

PRIORITY CLAIM

The instant patent application is related to and claims priority from the co-pending India provisional patent application entitled, "APPLICATION PERFORMANCE IN INFORMATION TECHNOLOGY INFRASTRUCTURE", Serial No. 201941039141, Filed: 27 Sep. 2019, which is incorporated in its entirety herewith.

BACKGROUND OF THE DISCLOSURE

Technical Field

The present disclosure relates to computing infrastructures and more specifically to identifying differences in resource usage across different versions of a software application.

Related Art

Software applications are deployed in computing infrastructures to process a large number of user requests. The computing infrastructures can be cloud infrastructures, enterprise infrastructure, a hybrid of cloud and enterprise infrastructures, as is well known in the relevant arts.

Processing of user requests causes consumption or usage of resources provided by the underlying computing infrastructure. The resources can be infrastructure resources such as compute/CPU, memory/RAM, disk/file storage, etc., or application resources such as database connections, application threads, etc.

Software applications are often modified for reasons such as addition/removal of features, bug fixes, improving/tuning performance, etc. A modified software application is released for usage as a corresponding version of the software.

There is often a need to identify differences in usage of resources across different versions of a software application. For example, it may be desirable to check whether a later version of a software application uses unreasonably more or less resources than that was used by an earlier version.

Aspects of the present disclosure are directed to identifying differences in resource usage across different versions of a software application.

BRIEF DESCRIPTION OF THE DRAWINGS

Example embodiments of the present disclosure will be described with reference to the accompanying drawings briefly described below.

FIG. 6A is a real-time transaction table depicting metrics captured for various transaction instances that have occurred in a block duration during the operation of a software application, in one embodiment.

FIG. 6B is a signature table depicting the work load signatures identified for a software application in one embodiment.

FIG. 6C is a real-time resource usage table depicting the usage of the resources in different sub-blocks (identical to sub-blocks in FIG. 6A) of a block duration while processing of transactions in the block duration in one embodiment.

FIG. 6E is a signature-resource correlation table depicting the extent of usage of each resource while a second version of a software application processes transactions corresponding to each workload signature in a block duration in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
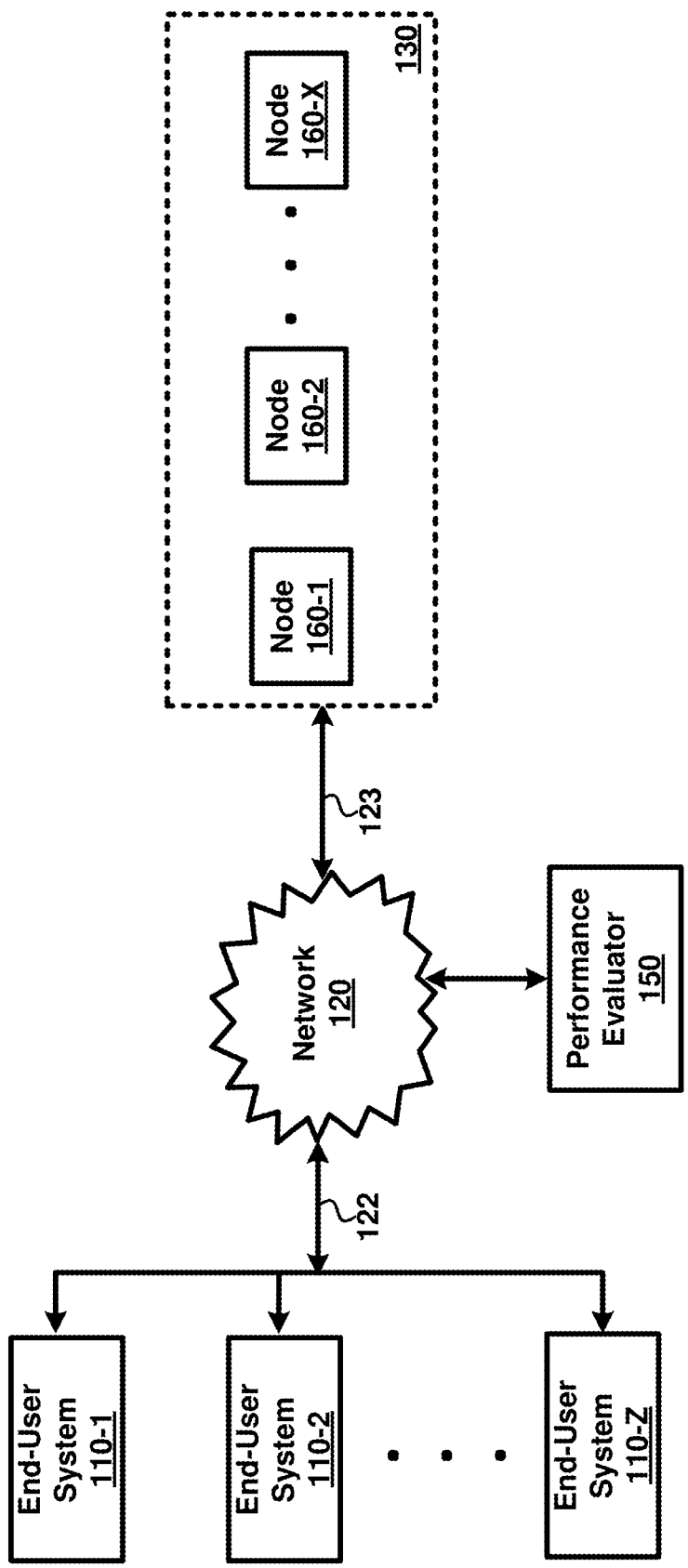
FIG. 1 is a block diagram illustrating an example environment (computing system) in which several aspects of the present invention can be implemented.

An aspect of the present disclosure facilitates identifying differences in resource usage across different versions of a software application. In one embodiment, a respective first usage of resources is quantified for each of a set of workload signatures during the processing of transaction instances using a first version of a software application in a first sequence of block durations. The quantifying for each workload signature is performed over a corresponding first set of block durations (contained in the first sequence) whose workload matches the workload signature.

Each workload signature representing a cluster of block signatures. Each block signature represents a respective workload on the software application in a corresponding block duration and is characterized by the transaction instances initiated in the corresponding block duration. In one embodiment, each workload signature and each block signature indicates a corresponding number of occurrences of transactions instances of each transaction type in the corresponding block duration.

A respective second usage of resources is quantified for each of the set of workload signatures during the processing of a transaction instances using a second version of the software application in a second sequence of block durations. The quantifying for each workload signature is performed over a corresponding second set of block durations (contained in the second sequence) whose workload matches the workload signature. For each workload signature, the respective first usage and the respective second usage are compared to identify differences in the resource usage across different versions of the software application.

According to another aspect of the present disclosure, the workload signatures are determined during the processing of transaction instances using the first version of the software application in the first sequence of block durations.

According to one more aspect of the present disclosure, the first version of the software application is deployed in a production environment at a first time instance, while the second version of the software application is deployed in the same production environment at a second time instance after the first time instance, with the second version representing a new version of the software application. As such, the quantifying the respective first usage is performed after the first time instance and prior to the second time instance, while the quantifying the respective second usage is performed after the second time instance. Accordingly, comparing facilitates the comparison of pre-performance and post-performance of the new version of the software application.

According to yet another aspect of the present disclosure, the first version of the software application is deployed in a production environment, while the second version of the software application is deployed in a test environment. The transaction instances processed by the first version are recorded in a non-volatile storage. The recorded transaction instances are then replayed from the non-volatile storage as the transaction instances for processing by the second version in the testing environment, wherein the quantifying of the respective second usage is performed in the test environment. Such a feature facilitates a newer (second) version to be tested with "live"/production data prior to deployment in the production environment.

According to an aspect of the present disclosure, the recording of the transaction instances is performed by recording a stream of network bytes (generated in the production environment) corresponding to each transaction instance. As such, replaying the transaction instances involves replaying the recorded stream of network bytes corresponding to each transaction instance in the testing environment.

According to another aspect of the present disclosure, a subset of the set of workload signatures is selected. Only a subset of the recorded transaction instances corresponding to the subset of workload signatures is then replayed, with the quantifying of the respective second usage being performed only for the subset of workload signatures. Also, the comparison of the respective first usage and the respective second usage is performed only for each of the subset of workload signatures.

According to one more aspect of the present disclosure, a first machine learning (ML) capacity model and a second ML capacity model are generated, the first ML capacity model correlating resource usage with different workload signatures for the first version of the software application and the second ML capacity model correlating resource usage with different workload signatures for the second version of the software application. The first respective usage and the second respective usage are then predicted based on the first ML capacity model and the second ML capacity model respectively.

According to yet another aspect of the present disclosure, a burn map indicating the usage of various resources for different workload signatures is displayed. The burn map highlights a set of resources that are determined to have a difference based on the first respective usage and the second respective usage.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment (computing system) in which several aspects of the present invention can be implemented. The block diagram is shown containing end-user systems 110-1 through 110-Z (Z representing any natural number), Internet 120, and computing infrastructure 130. Computing infrastructure 130 in turn is shown containing nodes 160-1 through 160-X (X representing any natural number). The end-user systems and nodes are collectively referred to by 110 and 160 respectively.

Merely for illustration, only representative number/type of systems are shown in FIG. 1. Many environments often contain many more systems, both in number and type, depending on the purpose for which the environment is designed. Each block of FIG. 1 is described below in further detail.

Computing infrastructure 130 is a collection of nodes (160) that may include processing nodes, connectivity infrastructure, data storages, administration systems, etc., which are engineered to together host software applications. Computing infrastructure 130 may be a cloud infrastructure (such as Amazon Web Services (AWS) available from Amazon.com, Inc., Google Cloud Platform (GCP) available from Google LLC, etc.) that provides a virtual computing infrastructure for various customers, with the scale of such computing infrastructure being specified often on demand.

Alternatively, computing infrastructure 130 may correspond to an enterprise system (or a part thereof) on the premises of the customers. Computing infrastructure 130 may also be a "hybrid" infrastructure containing some nodes of a cloud infrastructure and other nodes of an enterprise system. The description is continued assuming that computing infrastructure 130 is a cloud infrastructure and accordingly the terms "computing infrastructure 130" and "cloud infrastructure 130" are used interchangeably in the description hereafter.

All the nodes (160) of computing infrastructure 130 are assumed to be connected via an intranet. Internet 120 extends the connectivity of these (and other systems of the computing infrastructure) with external systems such as end-user systems 110. Each of intranet and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and intranet. When the packet contains content such as port numbers, which specifies a target application, the packet may be said to be directed to such application as well.

Each of end-user systems 110 represents a system such as a personal computer, workstation, mobile device, computing tablet etc., used by users to generate (user) requests directed to software applications executing in computing infrastructure 130. A user request refers to a specific technical request (for example, Universal Resource Locator (URL) call) sent to a server system from an external system (here, end-user system) over Internet 120, typically in response to a user interaction at end-user systems 110. The user requests may be generated by users using appropriate user interfaces (e.g., web pages provided by an application executing in a node, a native user interface provided by a portion of an application downloaded from a node, etc.).

In general, an end-user system requests a software application for performing desired tasks and receives the corresponding responses (e.g., web pages) containing the results of performance of the requested tasks. The web pages/responses may then be presented to a user by a client application such as the browser. Each user request is sent in the form of an IP packet directed to the desired system or software application, with the IP packet including data identifying the desired tasks in the payload portion.

Some of nodes 160 may be implemented as corresponding data stores. Each data store represents a non-volatile (persistent) storage facilitating storage and retrieval of enterprise by software applications executing in the other systems/nodes of computing infrastructure 130. Each data store may be implemented as a corresponding database server using relational database technologies and accordingly provide storage and retrieval of data using structured queries such as SQL (Structured Query Language). Alternatively, each data store may be implemented as a corresponding file server providing storage and retrieval of data in the form of files organized as one or more directories, as is well known in the relevant arts.

Some of the nodes 160 may be implemented as corresponding server systems. Each server system represents a server, such as a web/application server, constituted of appropriate hardware executing software applications capable of performing tasks requested by end-user systems 110. A server system receives a user request from an end-user system and performs the tasks requested in the user request. A server system may use data stored internally (for example, in a non-volatile storage/hard disk within the server system), external data (e.g., maintained in a data store) and/or data received from external sources (e.g., received from a user) in performing the requested tasks. The server system then sends the result of performance of the tasks to the requesting end-user system (one of 110) as a corresponding response to the user request. The results may be accompanied by specific user interfaces (e.g., web pages) for displaying the results to a requesting user.

Each of nodes 160 has a fixed number of resources such as memory (RAM), CPU (central processing unit) cycles, persistent storage, etc. that can be allocated to (and accordingly used by) software applications (or components thereof) executing in the node. Other resources that may also be provided associated with the cloud infrastructure (but not specific to a node) include public IP (Internet Protocol) addresses, etc. In addition to such infrastructure resources, application resources such as database connections, application threads, etc. may also be allocated to (and accordingly used by) the software applications (or components thereof).

In one embodiment, each customer/tenant is provided with a corresponding virtual computing infrastructure (referred to as a "cloud") hosted on nodes 160 of cloud infrastructure 130. Each customer may host desired software applications/data services on their cloud(s), which are capable of processing user requests received from end-user systems 110. The manner in which software applications are hosted in a cloud/computing infrastructure is described below with examples.

3. Software Applications in Cloud

Figure 2A:
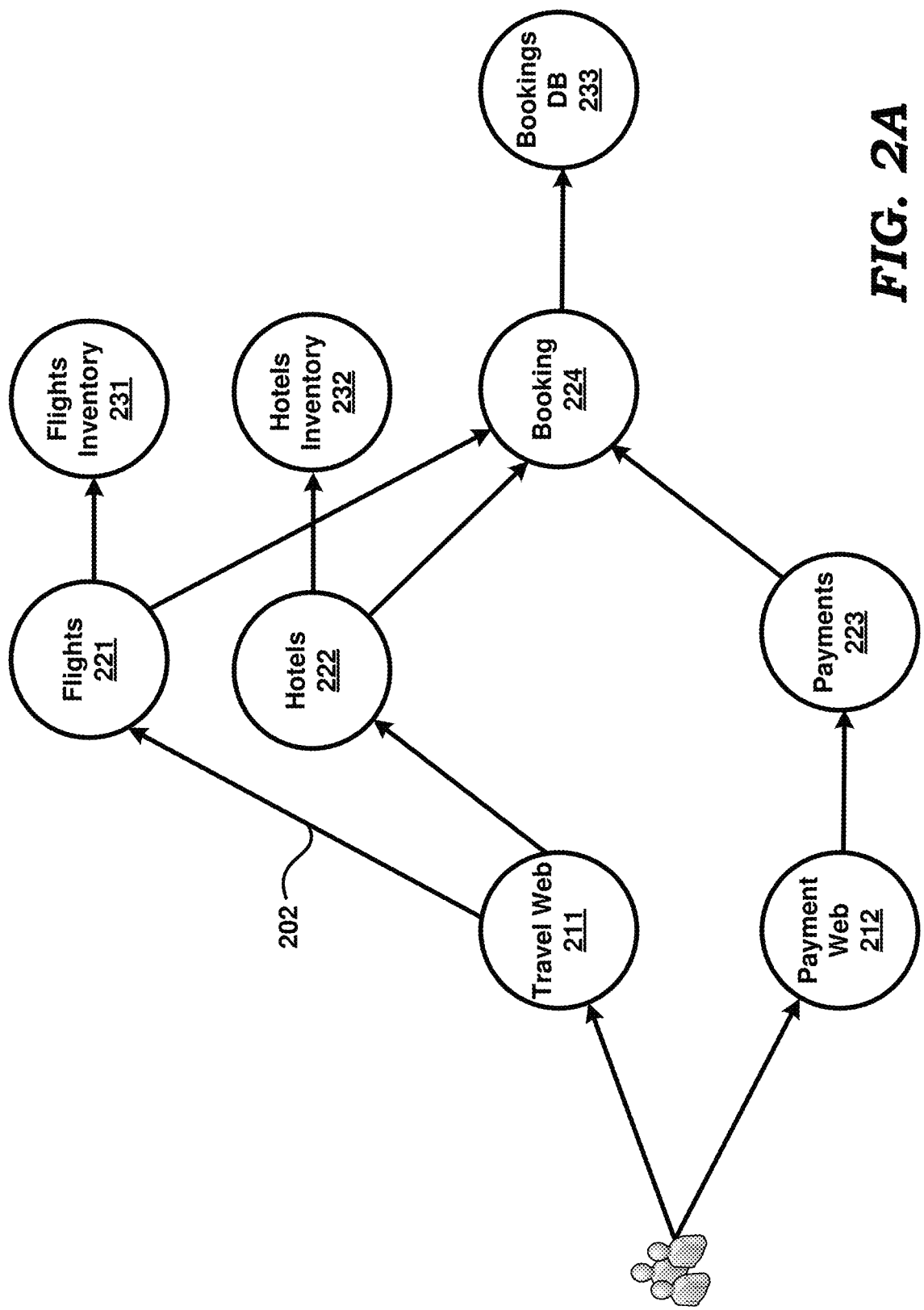
FIG. 2A depicts the components of a software application in one embodiment.

FIG. 2A depicts the components of a software application in one embodiment. For illustration, the software application is assumed to be an online travel application that enables users to search and book both flights and hotels. The online travel application is shown containing multiple components such as portals 211-212 (travel web and payment web respectively), internal/application services 221-224 (flights, hotels, payments and booking respectively) and data stores 231-233 (flights inventory, hotels inventory and bookings DB respectively). It may be appreciated that a software application may contain less or more components, differing in number and type, depending on the implementation of the software application.

Each of portals 211 and 212 represents a software component that is designed to process user requests received from external systems (such as end-user systems 110) connected to Internet 120 and send corresponding responses to the requests. For example, Travel Web portal 211 may receive (via path 122) user requests from a user using end-user system 110-2, process the received user requests by invoking one or more internal/application services (such as 221-223), and the results of processing as corresponding responses to end-user systems 110-2. The responses may include appropriate user interfaces for display in the requesting end-user system (110-2). Payment Web portal 212 may similarly interact with end-user system 110-2 and facilitate the user to make online payments.

Each of services 221-224 represents a software component that implements corresponding functionalities of the software application. Example of services are Flights service 231 providing the functionality of search of flights, Hotels service 222 providing the functionality of search of hotels, etc. A service (e.g. Flights service 221) may access/invoke other services (e.g. Booking service 224) and/or data stores (e.g. Flights Inventory 231) for providing the corresponding functionality.

Each of data stores 231-233 represents a storage component that maintains data used by other components of the software application. As noted above, each of the data stores may be implemented as a database server or file system based on the implementation of the software application.

The manner in which the various components of the software application (online travel application) is hosted in a cloud/computing infrastructure 130 is described below with examples.

In one embodiment, virtual machines (VMs) form the basis for executing various software applications in processing nodes/server systems of cloud infrastructure 130. As is well known, a virtual machine may be viewed as a container in which software applications (or components thereof) are executed. A processing node/server system can host multiple virtual machines, and the virtual machines provide a view of a complete machine (computer system) to the enterprise applications executing in the virtual machine. Thus, when multiple VMs are hosted on a single node, the resources (of the node) are shared by the VMs.

Figure 2C:
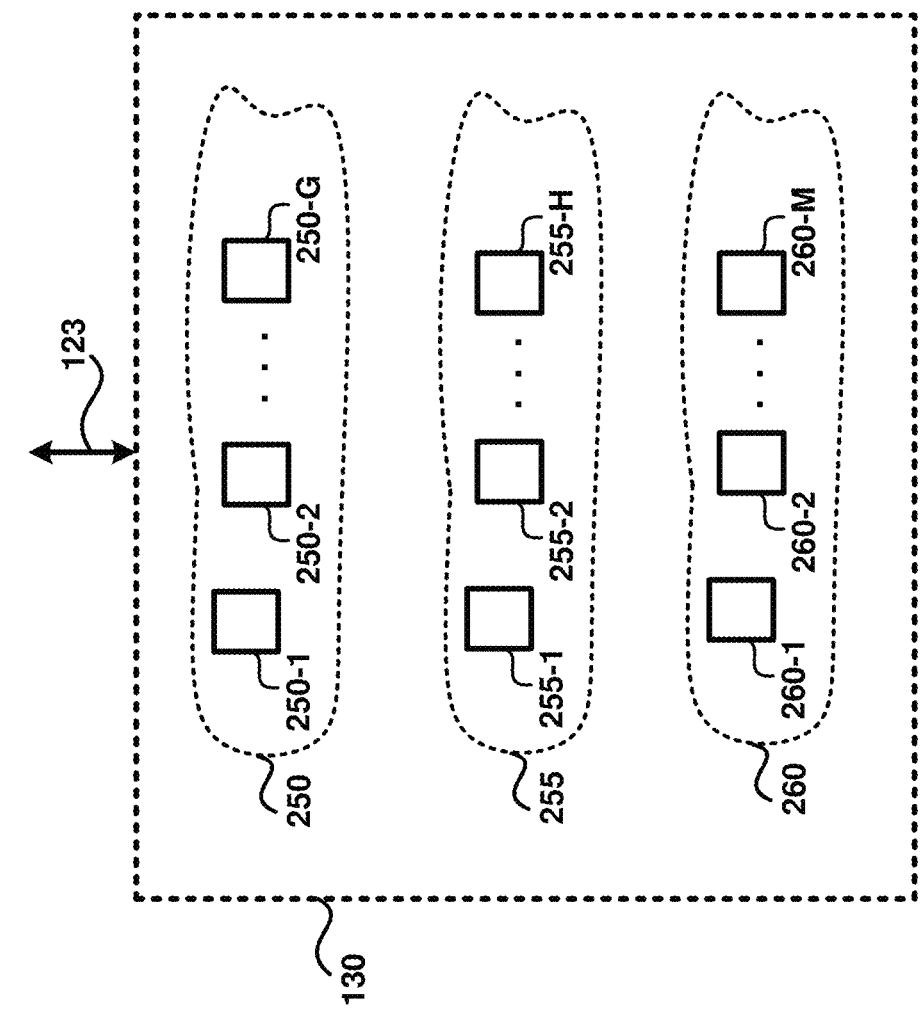
FIG. 2C illustrates the manner in which multiple clouds (and correspondingly software applications) are hosted in a cloud infrastructure in one embodiment.
Figure 2B:
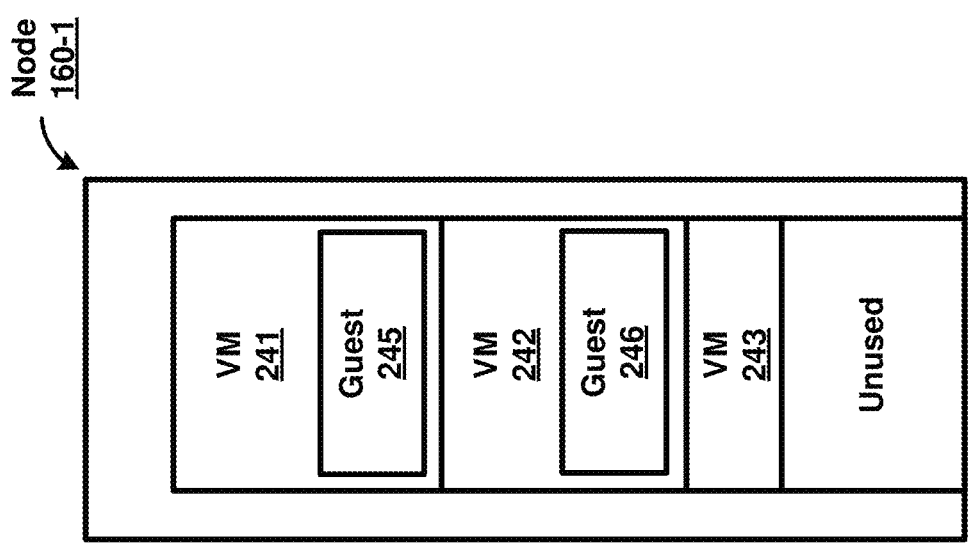
FIG. 2B illustrates an example state of a node in a cloud infrastructure.

FIG. 2B illustrates an example state of a node in a cloud infrastructure. Node 160-1 is shown hosting VMs 241, 242, and 243, with the resources of the node shown allocated among the three VMs and some resources shown as still remaining 'unused' (i.e., not provisioned for any execution entity within node 160-1). Some of VMs 241 and 242 is shown hosting guest (modules) 245 and 246. Guest modules 221/222 may correspond to one of software components (such as 211-212, 221-224 and 231-233) of the software application deployed in cloud infrastructure 130. Similarly, other VMs may be hosted in the other nodes of cloud infrastructure 130 and form the basis for deploying other software applications.

Each VM is associated with a resource definition which specifies the resources allocated to/used by the VM during its operation. The resource definition typically is in the form of a triplet C, M, S, where C is the number of CPU cycles (e.g. 1×, 2×, 4×), M is the amount of memory (RAM) in gigabytes (e.g. 1 GB, 2 GB, 4 GB) and S is the amount of persistent storage in gigabytes (e.g. 50 GB, 100 GB, 200 GB).

In one embodiment, a cloud for a customer/tenant is provisioned (created) by allocating a desired number of VMs hosted on nodes 160 in cloud infrastructure 130. Each VM in the cloud may have a corresponding resource definition. Multiple VMs may also have the same resource definition. The manner in which multiple clouds are provisioned in cloud infrastructure 130 is described below with examples.

FIG. 2C illustrates the manner in which multiple clouds (and correspondingly software applications) are hosted in a cloud infrastructure in one embodiment. Specifically, cloud infrastructure 130 is shown hosting clouds 250, 255 and 260. Cloud 250 is shown containing VMs 250-1 through 250-G (G representing any natural number) that may be provisioned on the different nodes 160 of cloud infrastructure 130. Similarly, clouds 255 and 260 are shown respectively containing VMs 255-1 through 255-H and 260-1 through 260-M (H and M representing any natural number). For illustration, it is assumed that each cloud (250, 255 and 260) hosts a corresponding software application (including multiple instances of the software components).

In addition, it is assumed that each of clouds 250 and 260 provides a production environment while cloud 255 provides a testing environment for a corresponding software application. As is well known, a production environment is where users (using end-user systems 110) interact with the software application, while a testing environment is where the software application is tested for bugs/issues and corresponding fixes are checked. A software application is typically first deployed and tested in the testing environment, and after ensuring that the application is stable and bug-free, moved/deployed to the production environment.

The manner in which components of a software application are deployed in a corresponding cloud (250, 255, and 260) is described below with examples.

Figure 2D:
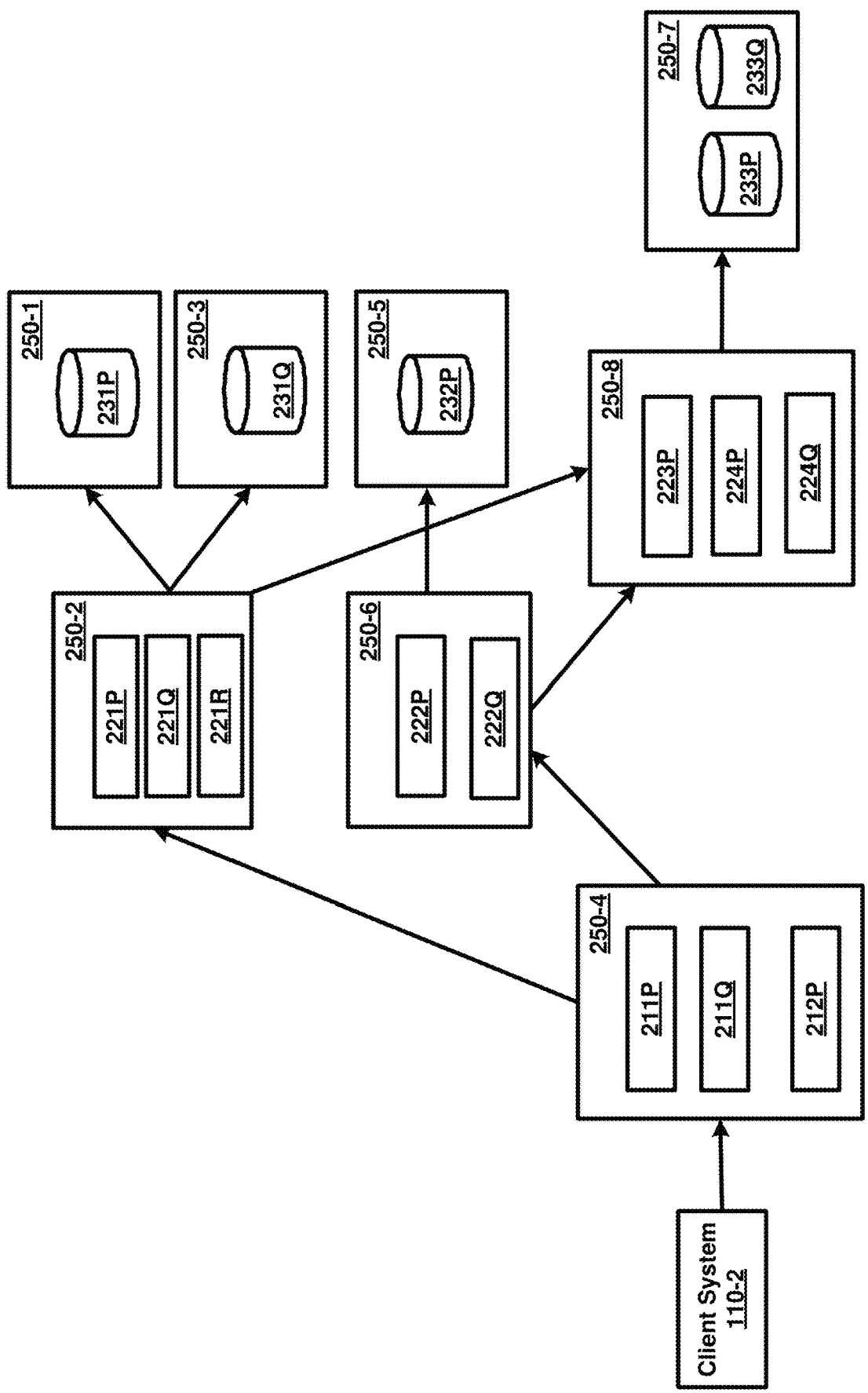
FIG. 2D depicts the manner in which components of a software application are deployed in a cloud in one embodiment.

FIG. 2D depicts the manner in which components of a software application are deployed in a cloud in one embodiment. In particular, the Figure depicts the manner in which the components of an online travel application shown in FIG. 2A are deployed in cloud 250 of FIG. 2C. For illustration, it is assumed that the components are deployed in eight VMs (i.e., G=8) provisioned as part of cloud 250.

Some of the components are shown having multiple instances, each instance representing a separate execution of the component. Such multiple instances may be necessitated for load balancing, throughput performance, etc. as is well known. Each instance (indicated by the suffix P, Q, R, etc.) is shown hosted and executing in a corresponding VM provisioned on nodes 160 of cloud infrastructure 130. For example, portal 211 is shown having two instances 211P and 211Q deployed on VM 250-4 of cloud 250.

Thus, a software application (online travel application) is hosted in cloud 250/computing infrastructure 130. During operation of the online travel application, a user using end-user system 110-2, may send various user requests for desired tasks such as searching for flights, selecting a flight (from a results of the search), booking a selected flight, etc. The processing of these user requests causes various software components to be invoked, which in turn may cause storage components to be accessed. The execution/access of the software/storage components may in turn consume resources (such computing, storage and networking) of cloud infrastructure 130. The relationship between the user interactions and the resource usage is described below with examples.

Figure 2E:
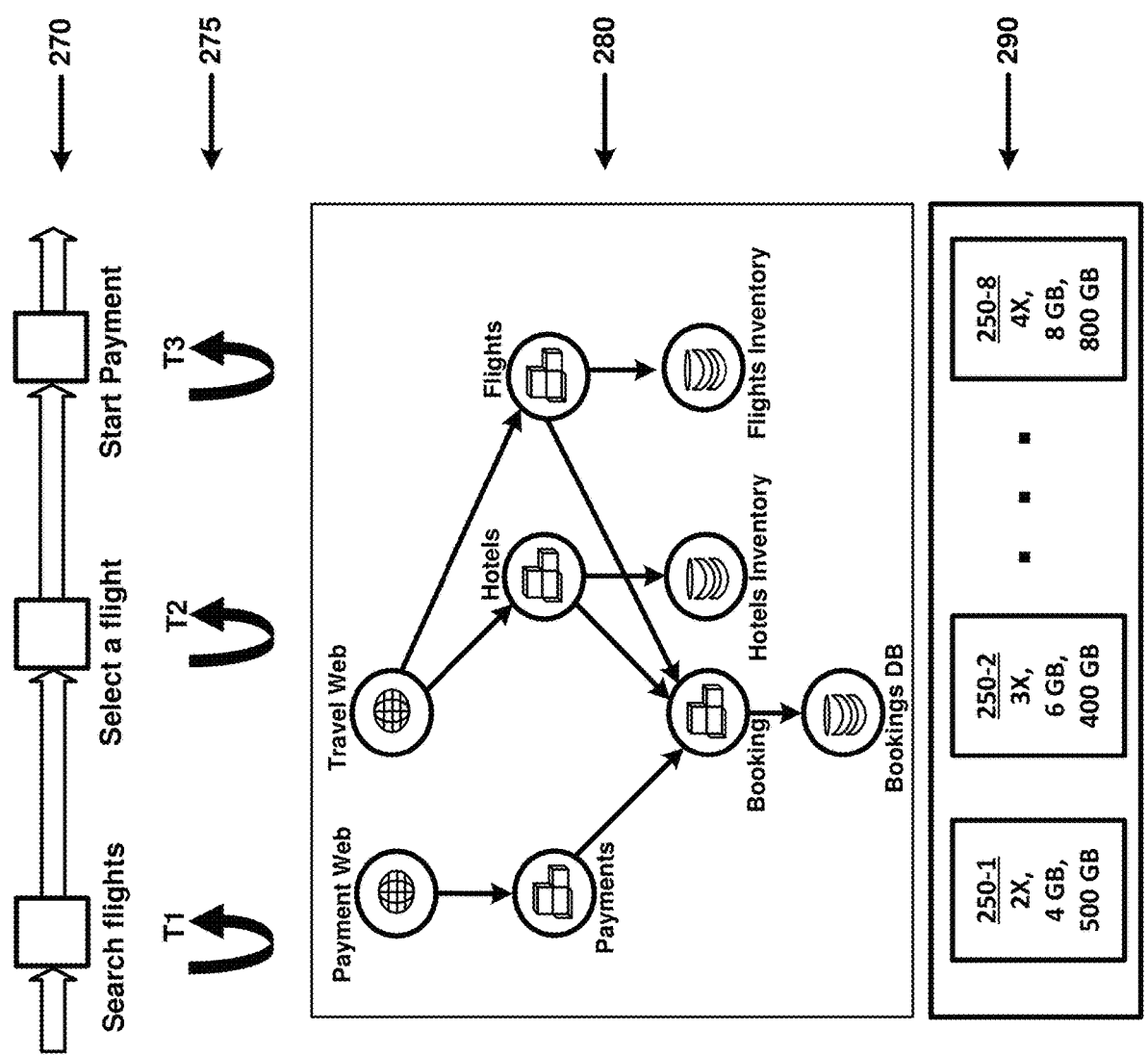
FIG. 2E depicts the relationship between the user interactions in a software application and the resource usage in a computing infrastructure in one embodiment.

FIG. 2E depicts the relationship between the user interactions with a software application and the resource usage in a computing infrastructure in one embodiment. User journeys 270 represent the various multi-stage user journeys that are conducted by users with a software application (here, the online travel application). A user journey represents a sequence of interactions a user conducts with a software application. A logical subset of interactions of the sequence is together viewed as a stage in the journey, with each such stage providing a corresponding functionality for the user. In the case of an online travel application, a user may be provided functionalities such as searching for flights, selection of one of the flights in the search results, and booking a ticket for the selected flight. The sequence of these three (in general, N) stages may be viewed as a single user journey (of three/N stages).

Some of the user interactions may be processed in the front end at the end user systems 110 from which the users access the application, while many of the user interactions may result in transaction requests that would be required to be processed in the backend by the software application.

Transactions 275 are initiated by the user interactions as a part of respective journeys. Each transaction (T1, T2, etc.) implies receipt of a corresponding user request that is to be processed by components 280, and a response is shown being provided to complete processing of the transaction. In the following disclosure, each transaction is viewed as being a corresponding "transaction instance" of a respective "transaction type".

Components 280 represent the software components implementing the various functionalities of a software application. Components 280 is shown including both the frontend facing portals 211-212 as well as internal services 221-224 and data stores 231-233.

Infrastructure 290 provides the infrastructure resources (such computing, storage and networking) utilized during operation of the software application. In one embodiment, the resources utilized are computed based on the resources allocated to the different VMs (e.g. 250-1, 250-2, etc.) hosting the software application in cloud infrastructure 130. Accordingly, each VM is shown along with its resource definition in 290.

Thus, interactions of users during user journeys 270 cause transactions to be initiated. The transactions constitute a workload for the software application. The transactions are processed by invocation of one or more software components. The operation of software components requires and uses infrastructure resources in 290.

Similarly, other software applications may be deployed and operational in corresponding clouds in cloud infrastructure 130. The software applications may be operative in a corresponding production or testing environment.

Multiple versions of a software application may be deployed in the corresponding clouds. For example, a first version of the software application executing in a production environment (cloud 250) may be overwritten by a second/newer version of the software application. As such, it may be desirable the compare the pre-performance and post-performance of the new version of the software application.

In another example, a first version of the software application may be deployed in a production environment (cloud 250), while a second version is deployed in a testing environment (cloud 255) for testing. In such an example, it may be desirable that the second version be tested with "live"/production data and validated prior to deployment in the production environment. Validation may entail checking whether the usage of resources by the second version is comparatively similar to the usage of resources by the first version.

Performance evaluator 150, provided according to several aspects of the present disclosure, facilitates identifying of differences in resource usage across different versions of a software application. Though performance evaluator 150 is shown external to computing infrastructure 130, in alternative embodiments, performance evaluator 150 may be implemented internal to computing infrastructure 130, for example, in one of nodes 160. The manner in which performance evaluator 150 facilitates identifying of differences in resource usage is described below with examples.

4. Identifying Differences in Resource Usage Across Different Versions

Figure 3:
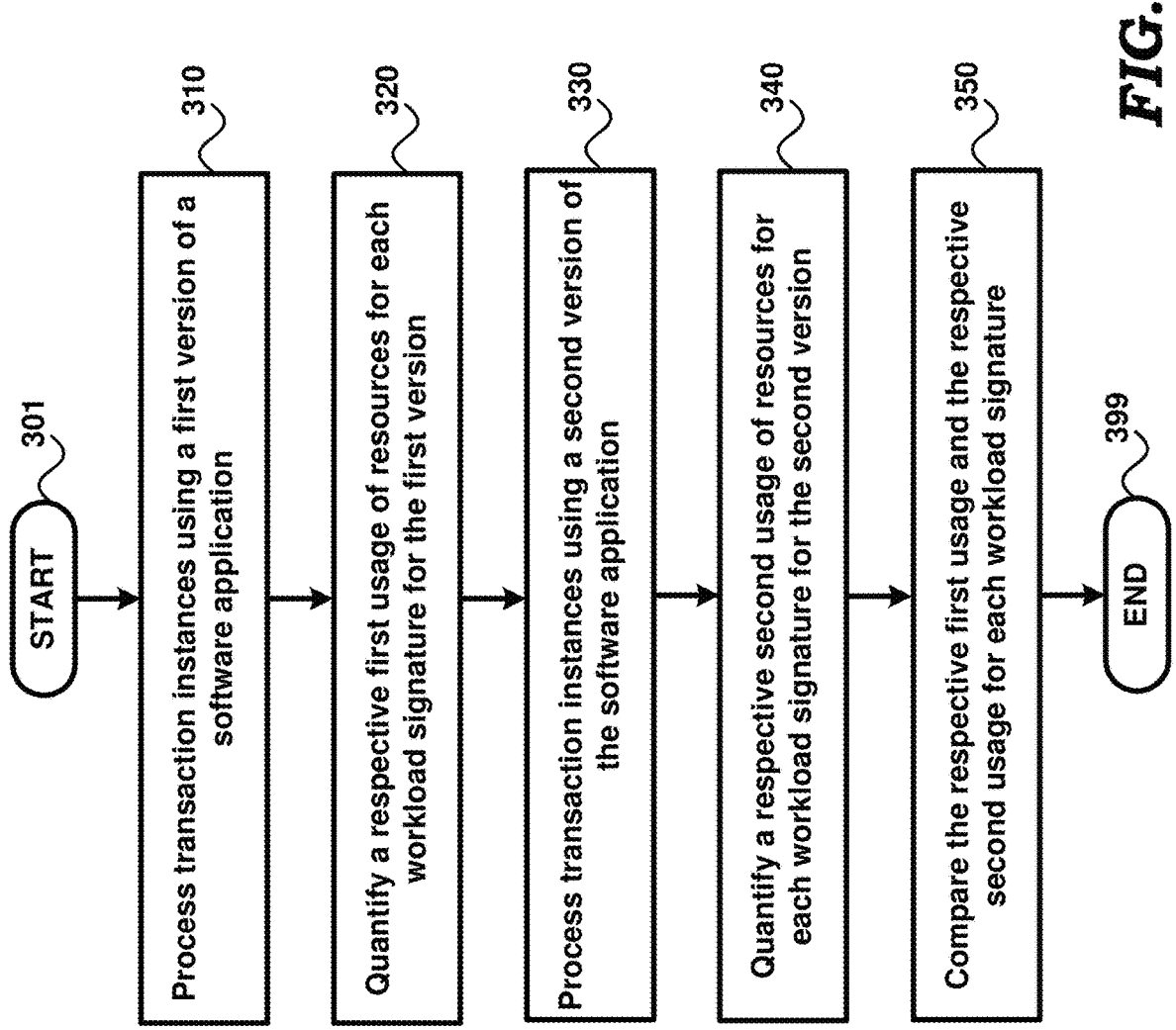
FIG. 3 is a flow chart illustrating the manner in which identifying of differences in resource usage across different versions of a software application is facilitated according to aspects of the present disclosure.

FIG. 3 is a flow chart illustrating the manner in which identifying of differences in resource usage across different versions of a software application is facilitated according to aspects of the present disclosure. The flowchart is described with respect to the systems of FIGS. 1 and 2A-2E, in particular performance evaluator 150, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 301, in which control immediately passes to step 310.

In step 310, a first set of transaction instances is processed using a first version of the software application (deployed in nodes 160 of cloud infrastructure 130) in a first sequence of block durations. The transaction instances received during a block duration represents the workload of the software application for that block duration.

In the description below, the block duration is assumed to be a minute, with measurements performed in smaller units (sub-block) of a second. Alternative embodiments can be employed with different durations for blocks and sub-blocks, as will be apparent to a skilled practitioner based on the disclosure provided herein.

In step 320, performance evaluator 150 quantifies a respective first usage of resources for each of a set of workload signatures during the processing of the first set of transaction instances (in step 310). A workload signature represents a corresponding cluster of workloads (in respective block durations) which are deemed to be similar based on statistical and mathematical approaches.

In one embodiment, the workload of each block duration is represented as a block signature and is characterized by the transaction instances initiated in the block duration. Specifically, each block signature and each workload signature indicate a corresponding number of occurrences of transactions instances of each transaction type in the corresponding block duration. A workload signature is then generated for a cluster of block signatures which are deemed to be statistically/mathematically similar.

Performance evaluator 150 performs the quantifying for each workload signature over a corresponding first set of block durations whose workload matches the workload signature, the corresponding first set being contained in the first sequence.

In step 330, a second set of transaction instances is processed using a second version of the software application in a second sequence of block durations. The second sequence may start after (either immediately or after some time) the end of the first sequence. Alternatively, the second sequence may overlap (have common block durations) with the first sequence.

In step 340, performance evaluator 150 quantifies a respective second usage of resources for each of the (same) set of workload signatures during the processing of the second set of transaction instances (in step 330). Performance evaluator 150 performs the quantifying for each workload signature over a corresponding second set of block durations whose workload matches the workload signature, the corresponding second set being contained in the second sequence.

According to an aspect, performance evaluator 150 generates a corresponding first and second machine learning (ML) capacity models, the first ML capacity model correlating resource usage with different workload signatures for the first version of the software application and the second ML capacity model correlating resource usage with different workload signatures for the second version of the software application. The first respective usage and the second respective usage are then predicted based on the first ML capacity model and the second ML capacity model respectively.

In step 350, performance evaluator 150 compares the respective first usage and the respective second usage for each workload signature to identify differences in the resource usage across different versions of the software application. Such identified differences may be used as the basis for comparing the pre-performance and post-performance of a newer version of the software application, validation of a version of the software application deployed in a testing environment, etc.

In step 360, performance evaluator 150 displays a burn map indicating the usage of various resources for different workload signatures. The burn map may be displayed on a display unit (not shown) associated with one of end-user systems 110. In particular, the burn map highlights a set of resources that are identified to have a difference based on the first respective usage and the second respective usage (in step 350). Control passes to step 399, where the flowchart ends.

Accordingly, performance evaluator 150 facilitates identifying of differences in resource usage across different versions of a software application. The manner in which performance evaluator 150 provides several aspects of the present disclosure according to the steps of FIG. 3 is illustrated below with examples.

5. Illustrative Example

FIGS. 4, 5, 6A-6E and 7 together illustrate the manner in which identifying of differences in resource usage across different versions of a software application is facilitated in one embodiment. Each of the Figures is described in detail below.

Figure 4:
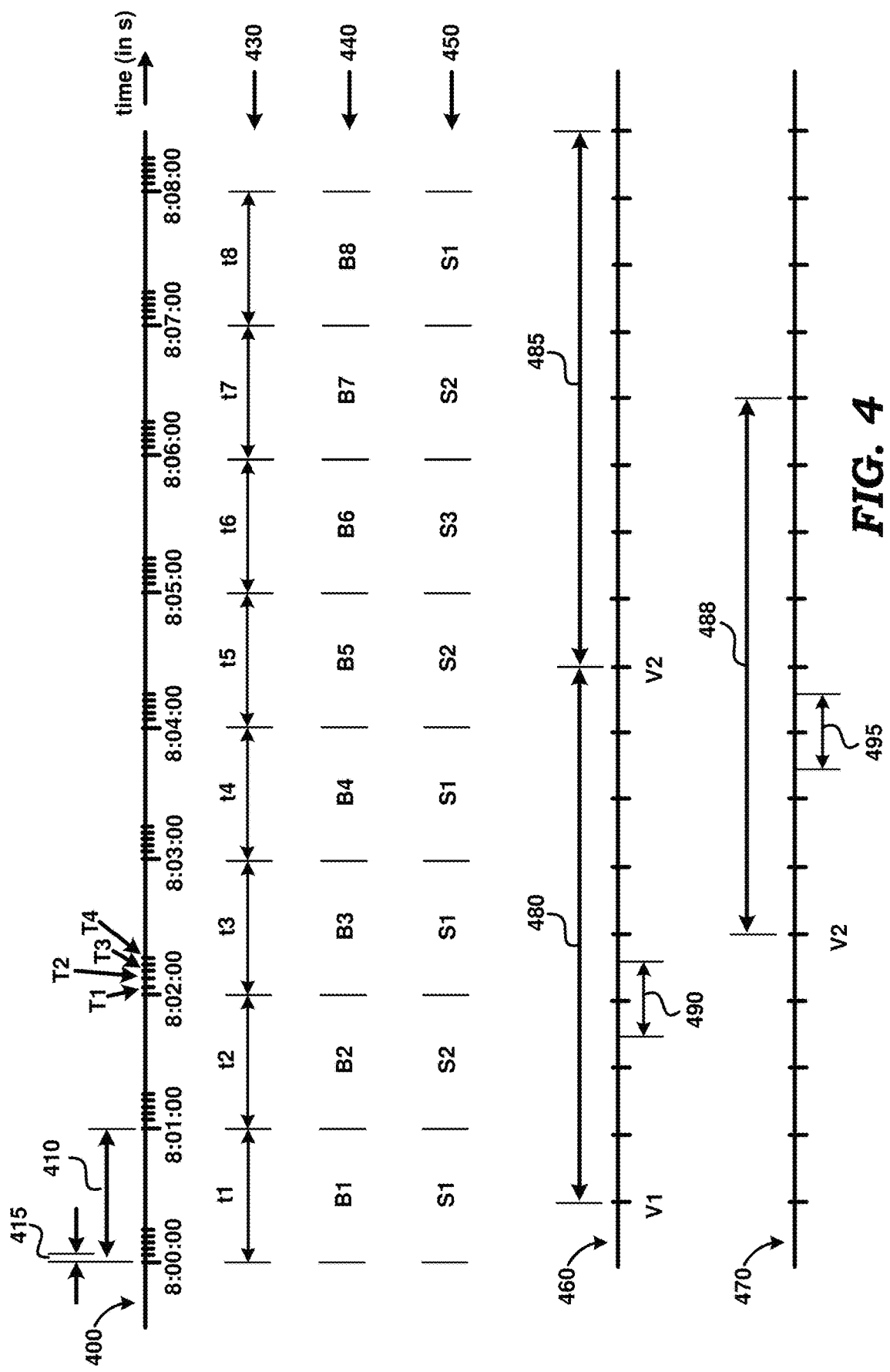
FIG. 4 depicts various timelines of operation of a software application in one embodiment.

FIG. 4 depicts various timelines of operation of a software application in one embodiment. Specifically, timeline 400 depicts the operation of a software application processing various transaction instances. For illustration, it is assumed that the transactions instances are received every second and accordingly timeline 400 is shown in seconds (as indicated by the 24-hour format "8:00:00").

Duration 415 represents the sub-block duration of one second, while duration 410 represents a block duration of one minute containing multiple (60) sub-block durations. Timeline 400 is shown having 8 block durations (t1 to t8) as indicated by 430. T1, T2, T3 and T4 indicate transaction instances (of corresponding transaction types) received during the block duration t3. Similarly, other transaction instances are received during the other block durations. B1 to B8 represent the block signatures determined respectively for the block duration t1 to t8 as indicated by 440. As noted above, each block signature indicates a corresponding number of occurrences of transactions instances of each transaction type in the corresponding block duration. Thus, the block signature B3 may be determined based on the count and type of the transaction instances T1, T2, T3, and T4 received in block duration t3.

A workload signature is then generated for a cluster of block signatures which are deemed to be statistically/mathematically similar. For example, the set of block signatures {B1, B3, B4, B8} may be determined to be similar and accordingly clustered together as a single workload signature S1. 450 indicates the workload signatures determined for each of the block durations t1 to t8. It may be readily observed that workload signatures S2 and S3 represent the cluster of block signatures {B2, B5, B7} and {B6} respectively.

According to an aspect, performance evaluator 150 facilitates the comparison of pre-performance and post-performance of a new version of a software application (here, online travel application). Such a comparison may be desirable in scenarios such as when a customer (deploying the software application) is encountering resource issues with the newer version, comparing the performance of different instances of the same software application deployed for different customers, etc.

Referring again to FIG. 4, timeline 460 depict the operation (in terms of block durations) of a software application in a production environment. V1 and V2 respectively indicate the time instances at which a first version and a second version of a software application is deployed in the corresponding environment. Each of sequences 480 and 485 represents a corresponding sequence of (eight) block durations during which the corresponding version of the software application processes transaction instances.

Thus, timeline 460 indicates that a first version deployed in a production environment at a first time instance (V1) processed the transaction instances in sequence 480, and that a second/newer version overwriting the first version deployed at a second time instance (V2, after the first time instance) processed the same transaction instances in the sequence 485.

Performance evaluator 150 quantifies a respective first usage and second usage of resources for each of a set of workload signatures during the processing of the transaction instances in sequences 480 and 485. Performance evaluator 150 then compares the respective first usage and the respective second usage for each workload signature to identify differences in the resource usage across different versions of the software application. Such identified differences are then used as the basis (e.g. using a burn map shown in FIG. 7) for comparing the pre-performance and post-performance of the newer version of the software application.

Thus, performance evaluator 150 facilitates identifying the differences in resource usage (and thereby comparing the performance) across different versions of the software application deployed in a production environment. Performance evaluator 150 may also be used in the testing of software applications as described below with examples.

6. Testing Software Applications

According to an aspect, performance evaluator 150 facilitates the validation of a (newer) version of a software application (here, online travel application) deployed in a testing environment. Such validation is performed based on "real production workload" that is based on the workload/transaction instances encountered by a (previous) version of the software application deployed in a production environment.

Referring again to FIG. 4, timeline 470 depict the operation (in terms of block durations) of a software application in a testing environment. V2 indicates the time instance at which a (second) version of a software application is deployed in the testing environment. Sequence 488 is the same as sequence 480 and accordingly represents a corresponding sequence of (eight) block durations during which the newer version of the software application processes transaction instances.

In one embodiment, performance evaluator 150 records the transaction instances received in sequence 480 in a non-volatile storage (such as an internal store, not shown) and replays the recorded transaction instances from the non-volatile storage as the transaction instances in sequence 488 in the testing environment. Such a feature facilitates the newer version of the software application to be tested with "live"/production data.

According to an aspect, performance evaluator 150 records a stream of network bytes (generated in the production environment) corresponding to each transaction instance, and then replays the recorded stream of network bytes corresponding to each transaction instance in the testing environment. The recording and replaying of streams of network bytes may reduce the resources/time required to perform the testing of a newer version of the software application (in particular, step 330 of FIG. 3 noted above).

Referring again to FIG. 4, 490 represents a duration of processing of a transaction instance (e.g. T4) related to booking of a flight by a user. As such, performance evaluator 150 records the stream of network bytes generated (on path 202) to instance 221P that processed T4 in the production environment. Performance evaluator 150 then replays the recorded stream of network bytes (in duration 495) to an instance of the component processing the booking of a flight in the testing environment. Thus, the transaction instance recorded in the production environment is replayed in the testing environment.

According to another aspect, performance evaluator 150 selects a subset of workload signatures (referred to as "golden signatures") from all of the workload signatures determined for the software application deployed in the production environment. Performance evaluator 150 then replays in the testing environment, only a subset of the recorded transaction instances corresponding to the selected/golden signatures, and then performs the comparison of the respective resource usage only for the selected/golden signatures.

Referring again to FIG. 4, performance evaluator 150 may select the golden signatures to be {S1, S3}, and accordingly, only the transaction instances in {t1, t3, t4, t6, t8} are replayed as part of sequence 488 in the testing environment. Such a selective testing of software application may be desirable to further reduce the resources/time required to perform the testing of the newer version of the software application.

The description is continued with an example implementation of performance evaluator 150 provided according to several aspects of the present disclosure.

7. Sample Implementation

Figure 5:
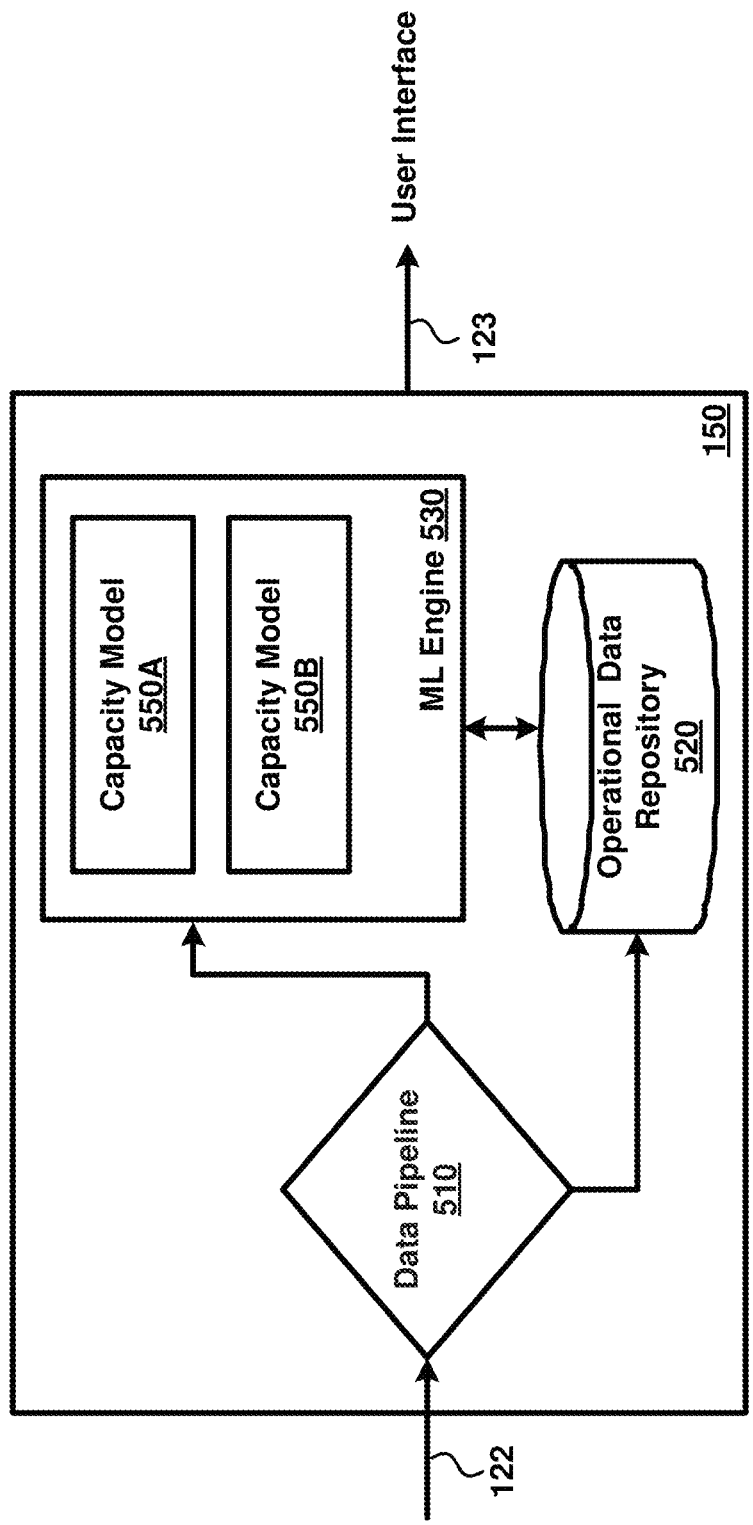
FIG. 5 is a block diagram depicting an example implementation of a performance evaluator (150) in one embodiment.

FIG. 5 is a block diagram depicting an example implementation of a performance evaluator (150) in one embodiment. The block diagram is shown containing data pipeline 510, operational data repository (ODR) 520 and ML engine 530 (in turn, shown containing capacity models 550A and 550B). Each of the blocks is described in detail below.

Data pipeline 510 receives operational data from different nodes 160 of cloud infrastructure 130 hosting the software application (e.g. online travel application) and determines the workload signatures based on the received data. The operational data is generated by the components/IT infrastructure during execution of the components/processing of transactions. Examples of operational data include average user turnaround/response time, user input time, the number of messages between internal services in context (of processing) of a user request or transaction, the number of hops/services made by each message, a break up of time taken across internal services (referred to as trace/time trace), etc. Example operational data is shown in transaction table 610 of FIG. 6A, described in detail below.

Data pipeline 510 then generates a block signature for the corresponding block duration. In particular, the block signature indicates the corresponding number of occurrences of transactions instances of each transaction type in the corresponding block duration. Data pipeline 510 similarly receives and processes transaction tables for other block durations.

Data pipeline 510 then identifies a workload signature representing a cluster of block signatures. In general, when clustering block signatures logged over a long duration (e.g., a week while block duration is a minute), fewer clusters would be realized and potentially resources used sub-optimally if a coarser parameters (distances) are chosen for clustering. On the other hand, choosing finer parameters would result in closer to optimal resource usage, but would result in more clusters.

In addition, as each cluster is characterized by a corresponding workload signature, the matching of current block signature would require fewer computations when there are fewer workload signatures. A balance may accordingly be realized by choosing appropriate parameters for clustering. Well-known clustering techniques such as partitioning methods, hierarchical clustering, fuzzy clustering, density-based clustering and model-based clustering may be used to identify a workload signature. Example workload signatures are shown in signatures tables 620 of FIG. 6B, described in detail below.

Data pipeline 510 also receives the details of the resources used for processing the transactions from nodes 160 of cloud infrastructure 130. The resources may be infrastructure resources such as CPU, memory, disk storage, file system, cache, etc. or may be application resources such as database connections, database cursors, threads, etc. Data pipelines 450 then forms a resource usage data that specifies the overall (of all the nodes) usage of resources by the software application during the processing of various transactions at different time instances (sub-blocks). Example resource usage data is shown in resource usage table 630 of FIG. 6C, described in detail below.

Data pipeline 510 stores tables 610, 620 and 630 in ODR 520. ODR 520 represents a data store that maintains portions of operation data. Though shown internal to performance evaluator 150, in alternative embodiments, ODR 520 may be implemented external to performance evaluator 150, for example, in one or more of nodes 160. Data pipeline 510 also forwards the data of tables 620 and 630 to ML engine 530.

ML engine 530 generates various models that correlate the data received from data pipeline 510. The models may be generated using any machine learning approach such as KNN (K Nearest Neighbor), Decision Tree, etc. Various other machine learning approaches can be employed, as will be apparent to skilled practitioners, by reading the disclosure provided herein. In an embodiment, supervised machine learning approaches are used.

Each of capacity models 550A and 550B correlates overall resource usage of the software application (table 630) to different workload signatures (table 620). In particular, capacity model 550A correlates resource usage with different workload signatures for a first version of a software application, while capacity model 550B correlates resource usage with different workload signatures for a second version of the software application. One approach to generating a capacity model is described in US Patent entitl*ed*, "Proactive Information Technology Infrastructure Management", U.S. Pat. No. 8,903,757 B2, naming as inventor Desikachari, and Applicant as "Appnomic Systems Private Limited".

Capacity models 550A and 550B are also stored in ODR 520 in the form of a corresponding signature-resource correlation table. Example correlation tables for a first version and a second version of a software application are shown respectively in table 640 of FIG. 6D and table 650 of FIG. 6E, described in detail below.

The description is continued with sample data that may be maintained in ODR 520 followed by the real-time operation of performance evaluator 150.

8. Sample Data

FIGS. 6A through 6E depicts sample data used in the identifying of differences in resource usage across different versions of a software application in one embodiment. Though shown in the form of tables, the sample data may be collected/maintained according to other data formats (such as extensible markup language (XML), etc.) and/or using other data structures (such as lists, trees, etc.), as will be apparent to one skilled in the relevant arts by reading the disclosure herein.

FIG. 6A is a real-time transaction table depicting metrics captured for various transaction instances that have occurred in a block duration during the operation of a software application, in one embodiment. In transaction table 610, the columns indicate the metrics captured, while the rows indicate the sub-blocks of one second in a block duration of one minute. Each cell (at the intersection of a row and column) thus indicates the value of metric captured for each sub-block in the block duration. It may be readily observed that for each transaction type (e.g. Txn_LOGIN), multiple metrics (such as average response time in column Txn_LOGIN_AvgRespTime) may be captured.

FIG. 6B is a signature table depicting the work load signatures identified for a software application in one embodiment. In signature table 620, the columns indicate the different transaction types, while each row indicates a corresponding workload signature (S1, S2, S3, etc.). Each cell indicates a corresponding number of occurrences of the transaction instances of the transaction type (indicated by the column).

FIG. 6C is a real-time resource usage table depicting the usage of the resources in different sub-blocks (identical to sub-blocks in FIG. 6A) of a block duration while processing of transactions in the block duration in one embodiment. In resource usage table 530, the columns indicate the various resources used by the (components of) software application, while the rows indicate the sub-blocks of one second in a block duration of one minute. Each cell thus indicates the extent/amount of resource used for each sub-block in the block duration.

Figure 6D:
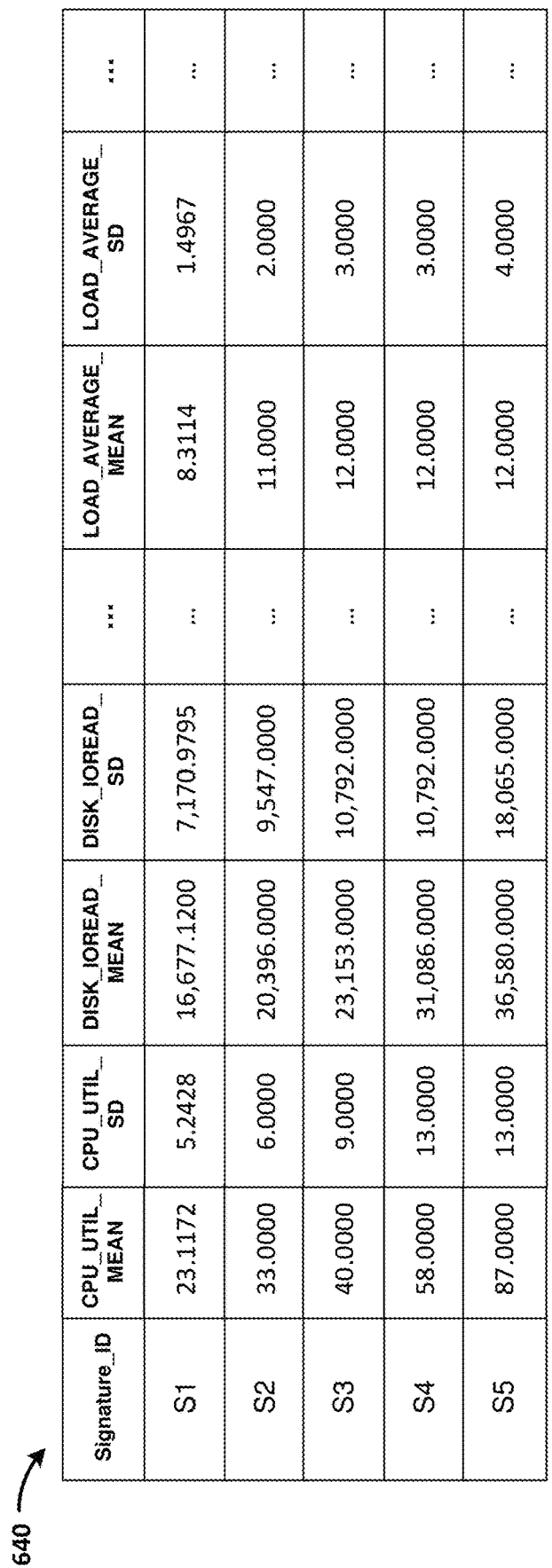
FIG. 6D is a signature-resource correlation table depicting the extent of usage of each resource while a first version of a software application processes transactions corresponding to each workload signature in a block duration in one embodiment.

FIG. 6D is a signature-resource correlation table depicting the extent of usage of each resource while a first version of a software application processes transactions corresponding to each workload signature in a block duration in one embodiment. In correlation table 640, the columns indicate the resource limits (mean and standard deviation (SD)) while the rows indicate the workload signatures. Thus, each cell indicates (in statistical terms) the resource usage expected for the corresponding workload signature.

FIG. 6E is a signature-resource correlation table depicting the extent of usage of each resource while a second version of a software application processes transactions corresponding to each workload signature in a block duration in one embodiment. Correlation table 650 is similar to correlation table 640, with each cell indicating (in statistical terms) the resource usage expected for the corresponding workload signature. It may be readily observed that the values in table 650 differ from the corresponding values in table 640, indicating that differences in the resource usage between the second and the first versions of the software application.

Thus, performance evaluator 150 maintains various data required for identifying of differences in resource usage across different versions of a software application. The manner in which performance evaluator 150 uses the data to provide several aspects of the present disclosure is described below with examples.

9. Real-Time Operation

During real-time operation, performance evaluator 150 receives operational data similar to that shown in transaction table 610 during the processing of transaction instances by a first version of the software application (online travel application). For example, performance evaluator 150 may receive the operational data during the processing of transaction instances in sequence 480.

Performance evaluator 150 then generates a current block signature for the current block duration, the block signature indicates the corresponding number of occurrences of transactions instances of each transaction type in the corresponding block duration (similar to S1, S2, etc. shown in signature table 620). Performance evaluator 150 then determines the workload signatures corresponding to the block signatures.

Performance evaluator 150 also receives the details of the resources used for processing the transactions from nodes 160 of cloud infrastructure 130, and generates the ML capacity model (e.g. 550A) correlating the resource usage with the determined workload signatures. The ML capacity model may then be stored as signature-resource correlation table 640.

Performance evaluator 150 then receives operational data similar to that shown in transaction table 610 during the processing of transaction instances by a second version of the software application (online travel application). For example, performance evaluator 150 may receive the operational data during the processing of transaction instances in sequence 485 (or 490).

Performance evaluator 150 then performs the actions of determining block signatures, determining workload signatures, generating ML capacity model (e.g. 550B) and storing the model as table 650. Performance evaluator 150 may then provide the data of tables 640 and 650 to a user (e.g. developer of the software application, administrator of cloud infrastructure 130) thereby facilitating the user to identify the differences in resource usage across different versions of a software application.

In particular, the user may compare the pre-performance (during sequence 480) and post-performance (during sequence 485) of a new/second version of the software application in the production environment. Alternatively, the user may validate a second version deployed in a testing environment by comparing the resource usage of a first version in a production environment (during sequence 480) and the resource usage of the second version (during sequence 490).

According to an aspect, performance evaluator 150 also displays a user interface that enables a user to view the differences in resource usage across different versions of a software application. Some sample user interfaces that may be provided by performance evaluator 150 are described in detail below.

10. Sample User Interfaces

Figure 7:
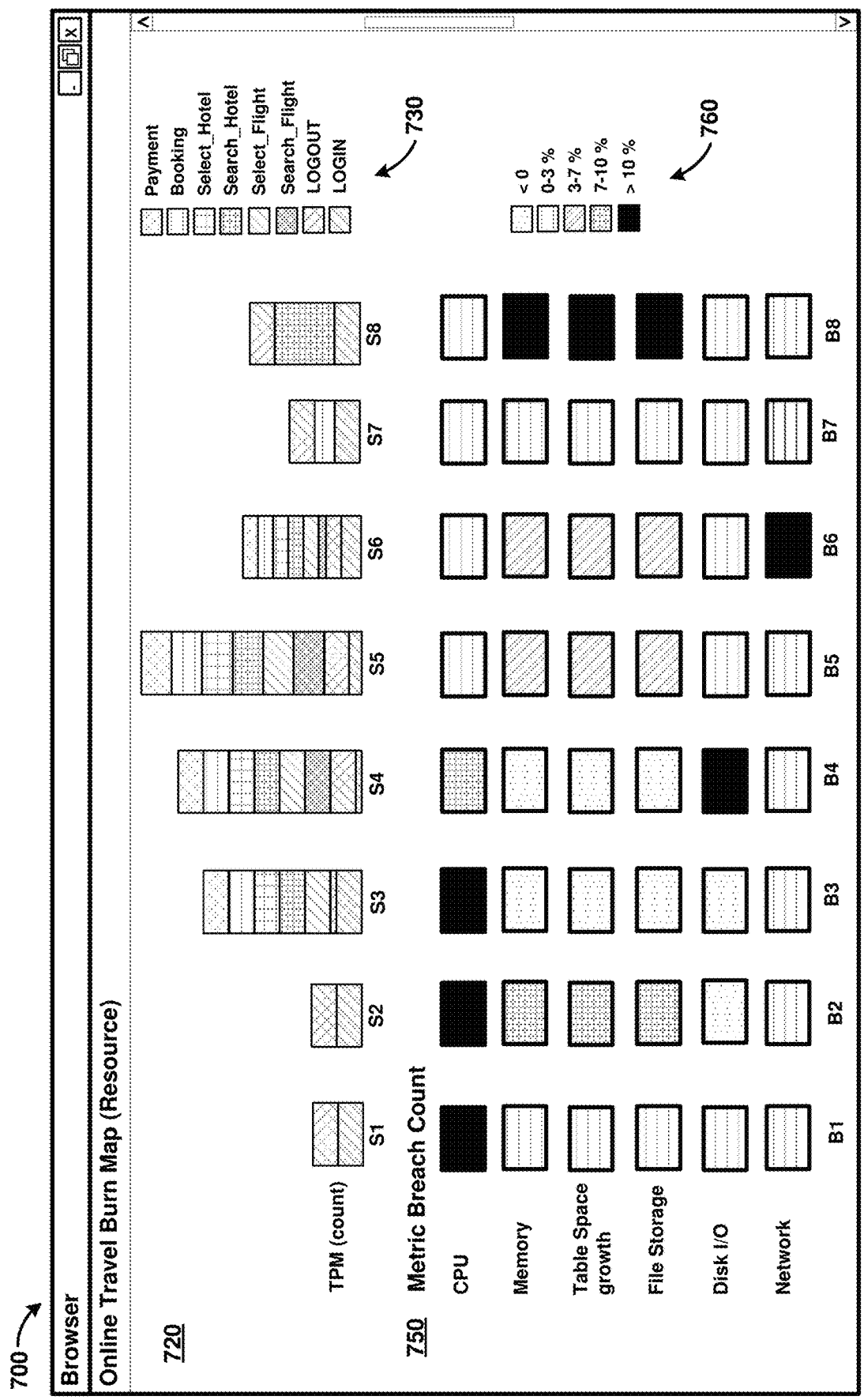
FIG. 7 is a graphical user interface depicting a burn map used for identifying differences in resource usage across difference versions of a software application in one embodiment.

FIG. 7 is a graphical user interface depicting a burn map used for identifying differences in resource usage across difference versions of a software application in one embodiment. Display area 700 represents a portion of a user interface displayed on a display unit (not shown) associated with one of end-user systems 110. In one embodiment, display area 700 corresponds to a web page rendered by a browser executing on the end-user system. Web pages are provided by performance evaluator 150 in response to a user sending appropriate requests (for example, by specifying corresponding URLs in the address bar) using the browser.

Display area 700 of FIG. 7 depicts an "Online Travel Burn Map (Resource)" web page that is displayed in the browser (executing in end-user system 110-1, for illustration) in response to a user specifying a URL.

Display area 720 shows the workload signatures determined during the processing of transaction instances using a first version of the software application (in sequence 180). Each workload signature is shown in the form of a stacked bar graph with the height of the stack indicating the number of transactions per minute (TPM) of a corresponding transaction type. The specific transaction types in the workload signatures are provided in the legend displayed in display area 730.

Display area 750 depicts a burn map indicating the usage of various resources (CPU, Memory, File Storage, etc.) for multiple workload signatures (S1 to S8). The resources are shown along one axis (here Y axis), while the workload signatures are shown along another axis (here X axis). The cell rectangle at the intersection of each resource and signatures indicates the difference in usage of the resource when processing that signature, with the different shades/patterns in the cell rectangle indicating a corresponding range of values for the difference.

The ranges of values for each difference are chosen such that the resources whose differences are above respective thresholds for the signatures are highlighted (shown as a black filled rectangle). In one embodiment, the threshold for all the differences is chosen as 10%, such that resources whose corresponding difference in usages for a signature exceeds 10% are highlighted with black cell rectangles. The ranges of values are then picked as shown in the legend displayed in display area 760.

It may be appreciated that the burn map may be used as the basis of identifying differences in resource usage (and thereby comparing the performance) of different versions of a software application. For example, by choosing to compare the resource usage of a first version and a second/newer version of a software application deployed in a production environment, the black filled rectangles indicate issues (increase in resource usage) with the newer version of the software application, while dot filled rectangles (<0) indicate efficiencies (decrease in resource usage) achieved with the newer version. Thus, a user may compare the pre-performance and of a new/second version of the software application in the production environment.

Alternatively, the user may validate a newer version of the software application deployed in a testing environment by choosing to compare the resource usage of a first version in a production environment (during sequence 480) and the resource usage of the newer version (during sequence 488). Here, the black filled rectangles indicate issues (increase in resource usage) with the newer version of the software application being tested in the testing environment.

It should be further appreciated that the features described above can be implemented in various embodiments as a desired combination of one or more of hardware, software, and firmware. The description is continued with respect to an embodiment in which various features are operative when the software instructions described above are executed.

11. Digital Processing System

Figure 8:
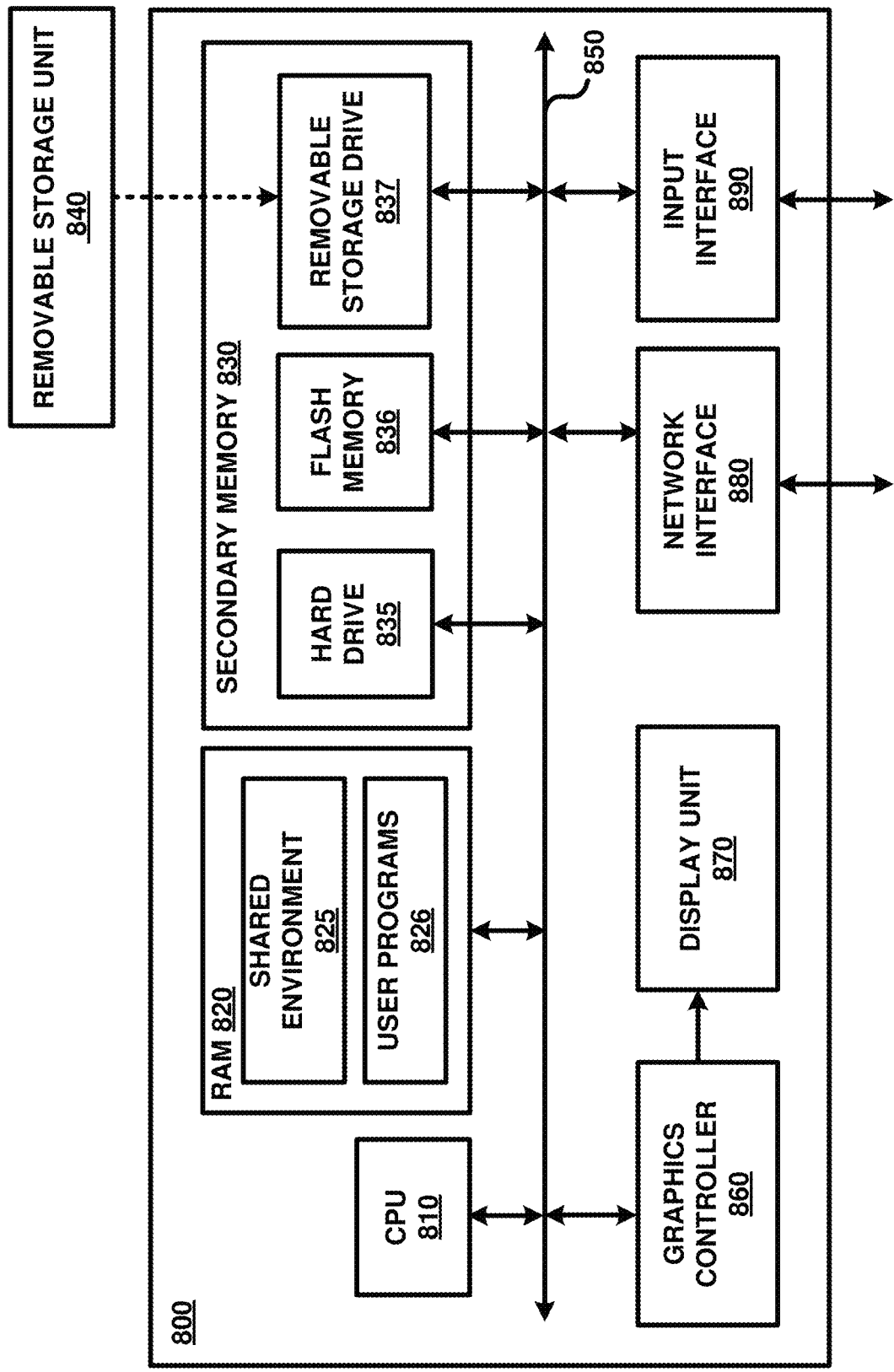
FIG. 8 is a block diagram illustrating the details of a digital processing system in which various aspects of the present disclosure are operative by execution of appropriate executable modules.

FIG. 8 is a block diagram illustrating the details of digital processing system 800 in which various aspects of the present disclosure are operative by execution of appropriate executable modules. Digital processing system 800 may correspond to performance evaluator 150 (or any system implementing performance evaluator 150).

Digital processing system 800 may contain one or more processors such as a central processing unit (CPU) 810, random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present disclosure. CPU 810 may contain multiple processing units, with each processing unit potentially being designed for a specific task. Alternatively, CPU 810 may contain only a single general-purpose processing unit.

RAM 820 may receive instructions from secondary memory 830 using communication path 850. RAM 820 is shown currently containing software instructions constituting shared environment 825 and/or other user programs 826 (such as other applications, DBMS, etc.). In addition to shared environment 825, RAM 820 may contain other software programs such as device drivers, virtual machines, etc., which provide a (common) run time environment for execution of other/user programs.

Graphics controller 860 generates display signals (e.g., in RGB format) to display unit 870 based on data/instructions received from CPU 810. Display unit 870 contains a display screen to display the images defined by the display signals (for example, portions of the graphical user interface of FIG. 7). Input interface 890 may correspond to a keyboard and a pointing device (e.g., touch-pad, mouse) and may be used to provide inputs (for example, the inputs required for the graphical user interface of FIG. 7). Network interface 880 provides connectivity to a network (e.g., using Internet Protocol), and may be used to communicate with other systems connected to the networks.

Secondary memory 830 may contain hard drive 835, flash memory 836, and removable storage drive 837. Secondary memory 830 may store the data (e.g. data portions of FIGS. 6A-6E) and software instructions (e.g. for implementing the steps of FIG. 3), which enable digital processing system 800 to provide several features in accordance with the present disclosure. The code/instructions stored in secondary memory 830 may either be copied to RAM 820 prior to execution by CPU 810 for higher execution speeds, or may be directly executed by CPU 810.

Some or all of the data and instructions may be provided on removable storage unit 840, and the data and instructions may be read and provided by removable storage drive 837 to CPU 810. Removable storage unit 840 may be implemented using medium and storage format compatible with removable storage drive 837 such that removable storage drive 837 can read the data and instructions. Thus, removable storage unit 840 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 830. Volatile media includes dynamic memory, such as RAM 820. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 850. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

12. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A non-transitory machine-readable medium storing one or more sequences of instructions for identifying differences in resource usage across different versions of a software application, wherein execution of said one or more sequences of instructions by one or more processors contained in a digital processing system causes said digital processing system to perform:

quantifying a respective first usage of resources for each workload signature of a plurality of workload signatures during processing of a first plurality of transaction instances using a first version of said software application in a first sequence of block durations, wherein each workload signature of said plurality of workload signatures represents a cluster of block signatures, and wherein each block signature of said cluster of block signatures represents a respective workload on said software application in a corresponding block duration and is characterized by said first plurality of transaction instances initiated in said corresponding block duration, wherein said quantifying of said respective first usage of resources for each workload signature of said plurality of workload signatures is performed over a corresponding first set of block durations whose workload matches said workload signature, and wherein said corresponding first set of block durations is contained in said first sequence of block durations;

quantifying a respective second usage of resources for each workload signature of said plurality of workload signatures during processing of a second plurality of transaction instances using a second version of said software application in a second sequence of block durations, wherein said quantifying of said respective second usage of resources for each workload signature of said plurality of workload signatures is performed over a corresponding second set of block durations whose workload matches said workload signature of said plurality of workload signatures, and wherein said corresponding second set of block durations is contained in said second sequence of block durations;

comparing, for each workload signature of said plurality of workload signatures, said respective first usage of resources and said respective second usage of resources for each workload signature of said plurality of workload signatures to identify differences in said resource usage across different versions of said software application; and presenting to a user in a graphical user interface said resource usage of a plurality of resources for a plurality of workload signatures, wherein said presenting to said user in said graphical user interface highlights a set of resources that are determined to have a difference based on said respective first usage of resources and said respective second usage of resources for each workload signature of said plurality of workload signatures, and wherein said highlighted set of resources is contained in said plurality of resources for said plurality of workload signatures.

2. The non-transitory machine-readable medium of claim 1, wherein each workload signature of said plurality of workload signatures and each block signature of said cluster of block signatures indicate a corresponding number of occurrences of transaction instances of each transaction type in said corresponding block duration, further comprising one or more sequences of instructions to perform determining said plurality of workload signatures during said processing of said first plurality of transaction instances using said first version of said software application in said first sequence of block durations.

3. The non-transitory machine-readable medium of claim 2, wherein said first version of said software application is deployed in a production environment at a first time instance, wherein said second version of said software application is deployed in said production environment at a second time instance after said first time instance, and wherein said second version of said software application represents a new version of said software application, wherein said quantifying of said respective first usage of resources for each workload signature of said plurality of workload signatures is performed after said first time instance and prior to said second time instance, and wherein said quantifying of said respective second usage of resources for each workload signature of said plurality of workload signatures is performed after said second time instance, and wherein said comparing of said respective first usage of resources and said respective second usage of resources for each workload signature of said plurality of workload signatures facilitates a comparison of pre-performance and post-performance of said new version of said software application.

4. The non-transitory machine-readable medium of claim 2, wherein said first version of said software application is deployed in a production environment and said second version of said software application is deployed in a testing environment, further comprising one or more sequences of instructions to perform:

recording said first plurality of transaction instances in a non-volatile storage; and replaying said first plurality of transaction instances from said non-volatile storage as said second plurality of transaction instances in said testing environment, wherein said quantifying of said respective second usage of resources for each workload signature of said plurality of workload signatures is performed in said testing environment.

5. The non-transitory machine-readable medium of claim 4, wherein said recording of said first plurality of transaction instances in said non-volatile storage records a stream of network bytes corresponding to each transaction instance of said first plurality of transaction instances in said non-volatile storage, and wherein said replaying of said first plurality of transaction instances from said non-volatile storage replays said stream of network bytes corresponding to each transaction instance of said first plurality of transaction instances as said second plurality of transaction instances in said testing environment.

6. The non-transitory machine-readable medium of claim 5, further comprising one or more sequences of instructions to perform:

selecting a set of workload signatures from said plurality of workload signatures, wherein said replaying of said first plurality of transaction instances from said non-volatile storage replays only a subset of said first plurality of transaction instances corresponding to said set of workload signatures from said plurality of workload signatures, wherein said quantifying of said respective second usage of resources for each workload signature of said plurality of workload signatures is performed for each workload signature of said set of workload signatures from said plurality of workload signatures, and wherein said comparing of said respective first usage of resources and said respective second usage of resources for each workload signature of said plurality of workload signatures compares said respective first usage of resources and said respective second usage of resources for each workload signature of said plurality of workload signatures for each workload signature of said set of workload signatures from said plurality of workload signatures.

7. The non-transitory machine-readable medium of claim 1, further comprising one or more sequences of instructions to perform:

generating a first machine learning (ML) capacity model and a second ML capacity model, wherein said first ML capacity model correlates resource usage with different workload signatures for said first version of said software application and said second ML capacity model correlates resource usage with different workload signatures for said second version of said software application; and predicting said respective first usage of resources and said respective second usage of resources for each workload signature of said plurality of workload signatures based on said first ML capacity model and said second ML capacity model respectively.

8. The non-transitory machine-readable medium of claim 1, wherein said graphical user interface is a burn map.

9. A method for identifying differences in resource usage across different versions of a software application, the method comprising:

quantifying a respective first usage of resources for each workload signature of a plurality of workload signatures during processing of a first plurality of transaction instances using a first version of said software application in a first sequence of block durations, wherein each workload signature of said plurality of workload signatures represents a cluster of block signatures, and wherein each block signature of said cluster of block signatures represents a respective workload on said software application in a corresponding block duration and is characterized by said first plurality of transaction instances initiated in said corresponding block duration, wherein said quantifying of said respective first usage of resources for each workload signature of said plurality of workload signatures is performed over a corresponding first set of block durations whose workload matches said workload signature, and wherein said corresponding first set of block durations is contained in said first sequence of block durations;

quantifying a respective second usage of resources for each workload signature of said plurality of workload signatures during processing of a second plurality of transaction instances using a second version of said software application in a second sequence of block durations,
wherein said quantifying of said respective second usage of resources for each workload signature of said plurality of workload signatures is performed over a corresponding second set of block durations whose workload matches said workload signature of said plurality of workload signatures, and wherein said corresponding second set of block durations is contained in said second sequence of block durations;
comparing, for each workload signature of said plurality of workload signatures, said respective first usage of resources and said respective second usage of resources for each workload signature of said plurality of workload signatures to identify differences in said resource usage across different versions of said software application; and
presenting to a user in a graphical user interface said resource usage of a plurality of resources for a plurality of workload signatures,
wherein said presenting to said user in said graphical user interface highlights a set of resources that are determined to have a difference based on said respective first usage of resources and said respective second usage of resources for each workload signature of said plurality of workload signatures, and wherein said highlighted set of resources is contained in said plurality of resources for said plurality of workload signatures.

10. The method of claim 9, wherein each workload signature of said plurality of workload signatures and each block signature of said cluster of block signatures indicate a corresponding number of occurrences of transaction instances of each transaction type in said corresponding block duration,
said method further comprising determining said plurality of workload signatures during said processing of said first plurality of transaction instances using said first version of said software application in said first sequence of block durations.

11. The method of claim 10, wherein said first version of said software application is deployed in a production environment at a first time instance, wherein said second version of said software application is deployed in said production environment at a second time instance after said first time instance, and wherein said second version of said software application represents a new version of said software application,
wherein said quantifying of said respective first usage of resources for each workload signature of said plurality of workload signatures is performed after said first time instance and prior to said second time instance, and wherein said quantifying of said respective second usage of resources for each workload signature of said plurality of workload signatures is performed after said second time instance, and
wherein said comparing of said respective first usage of resources and said respective second usage of resources for each workload signature of said plurality of workload signatures facilitates a comparison of pre-performance and post-performance of said new version of said software application.

12. The method of claim 10, wherein said first version of said software application is deployed in a production environment and said second version of said software application is deployed in a testing environment, said method further comprising:

recording said first plurality of transaction instances in a non-volatile storage; and
replaying said first plurality of transaction instances from said non-volatile storage as said second plurality of transaction instances in said testing environment, wherein said quantifying of said respective second usage of resources for each workload signature of said plurality of workload signatures is performed in said testing environment.

13. The method of claim 10, further comprising:
generating a first machine learning (ML) capacity model and a second ML capacity model, wherein said first ML capacity model correlates resource usage with different workload signatures for said first version of said software application and said second ML capacity model correlates resource usage with different workload signatures for said second version of said software application; and
predicting said respective first usage of resources and said respective second usage of resources for each workload signature of said plurality of workload signatures based on said first ML capacity model and said second ML capacity model respectively.

14. The method of claim 9, wherein said graphical user interface is a burn map.

15. A digital processing system comprising:
a random access memory (RAM) to store instructions; and
one or more processors to retrieve and execute the instructions, wherein execution of the instructions causes the digital processing system to perform:
quantifying a respective first usage of resources for each workload signature of a plurality of workload signatures during processing of a first plurality of transaction instances using a first version of a software application in a first sequence of block durations,
wherein each workload signature of said plurality of workload signatures represents a cluster of block signatures, and wherein each block signature of said cluster of block signatures represents a respective workload on said software application in a corresponding block duration and is characterized by said first plurality of transaction instances initiated in said corresponding block duration,
wherein said quantifying of said respective first usage of resources for each workload signature of said plurality of workload signatures is performed over a corresponding first set of block durations whose workload matches said workload signature, and wherein said corresponding first set of block durations is contained in said first sequence of block durations;
quantifying a respective second usage of resources for each workload signature of said plurality of workload signatures during processing of a second plurality of transaction instances using a second version of said software application in a second sequence of block durations,
wherein said quantifying of said respective second usage of resources for each workload signature of said plurality of workload signatures is performed over a corresponding second set of block durations whose workload matches said workload signature of said plurality of workload signatures, and wherein said corresponding second set of block durations is contained in said second sequence of block durations;

comparing, for each workload signature of said plurality of workload signatures, said respective first usage of resources and said respective second usage of resources for each workload signature of said plurality of workload signatures to identify differences in said resource usage across different versions of said software application; and presenting to a user in a graphical user interface said resource usage of a plurality of resources for a plurality of workload signatures, wherein said presenting to said user in said graphical user interface highlights a set of resources that are determined to have a difference based on said respective first usage of resources and said respective second usage of resources for each workload signature of said plurality of workload signatures, and wherein said highlighted set of resources is contained in said plurality of resources for said plurality of workload signatures.

16. The digital processing system of claim 15, wherein each workload signature of said plurality of workload signatures and each block signature of said cluster of block signatures indicate a corresponding number of occurrences of transaction instances of each transaction type in said corresponding block duration, said digital processing system further performing determining said plurality of workload signatures during said processing of said first plurality of transaction instances using said first version of said software application in said first sequence of block durations.

17. The digital processing system of claim 16, wherein said first version of said software application is deployed in a production environment at a first time instance, wherein said second version of said software application is deployed in said production environment at a second time instance after said first time instance, and wherein said second version of said software application represents a new version of said software application, wherein said quantifying of said respective first usage of resources for each workload signature of said plurality of workload signatures is performed after said first time instance and prior to said second time instance, and wherein said quantifying of said respective second usage of resources for each workload signature of said plurality of workload signatures is performed after said second time instance, and wherein said comparing of said respective first usage of resources and said respective second usage of resources for each workload signature of said plurality of workload signatures facilitates a comparison of pre-performance and post-performance of said new version of said software application.

18. The digital processing system of claim 16, wherein said first version of said software application is deployed in a production environment and said second version of said software application is deployed in a testing environment, said digital processing system further performing:

recording said first plurality of transaction instances in a non-volatile storage; and replaying said first plurality of transaction instances from said non-volatile storage as said second plurality of transaction instances in said testing environment, wherein said quantifying of said respective second usage of resources for each workload signature of said plurality of workload signatures is performed in said testing environment.

19. The digital processing system of claim 15, further performing:

generating a first machine learning (ML) capacity model and a second ML capacity model, wherein said first ML capacity model correlates resource usage with different workload signatures for said first version of said software application and said second ML capacity model correlates resource usage with different workload signatures for said second version of said software application; and predicting said respective first usage of resources and said respective second usage of resources for each workload signature of said plurality of workload signatures based on said first ML capacity model and said second ML capacity model respectively.

20. The digital processing system of claim 15, wherein said graphical user interface is a burn map.

* * * * *